Sept. 14, 1926.  
E. G. STAUDE  
1,599,439  
HYDRAULIC BRAKE  
Filed July 24, 1924   5 Sheets-Sheet 1

INVENTOR  
EDWIN G. STAUDE  
BY  
ATTORNEYS

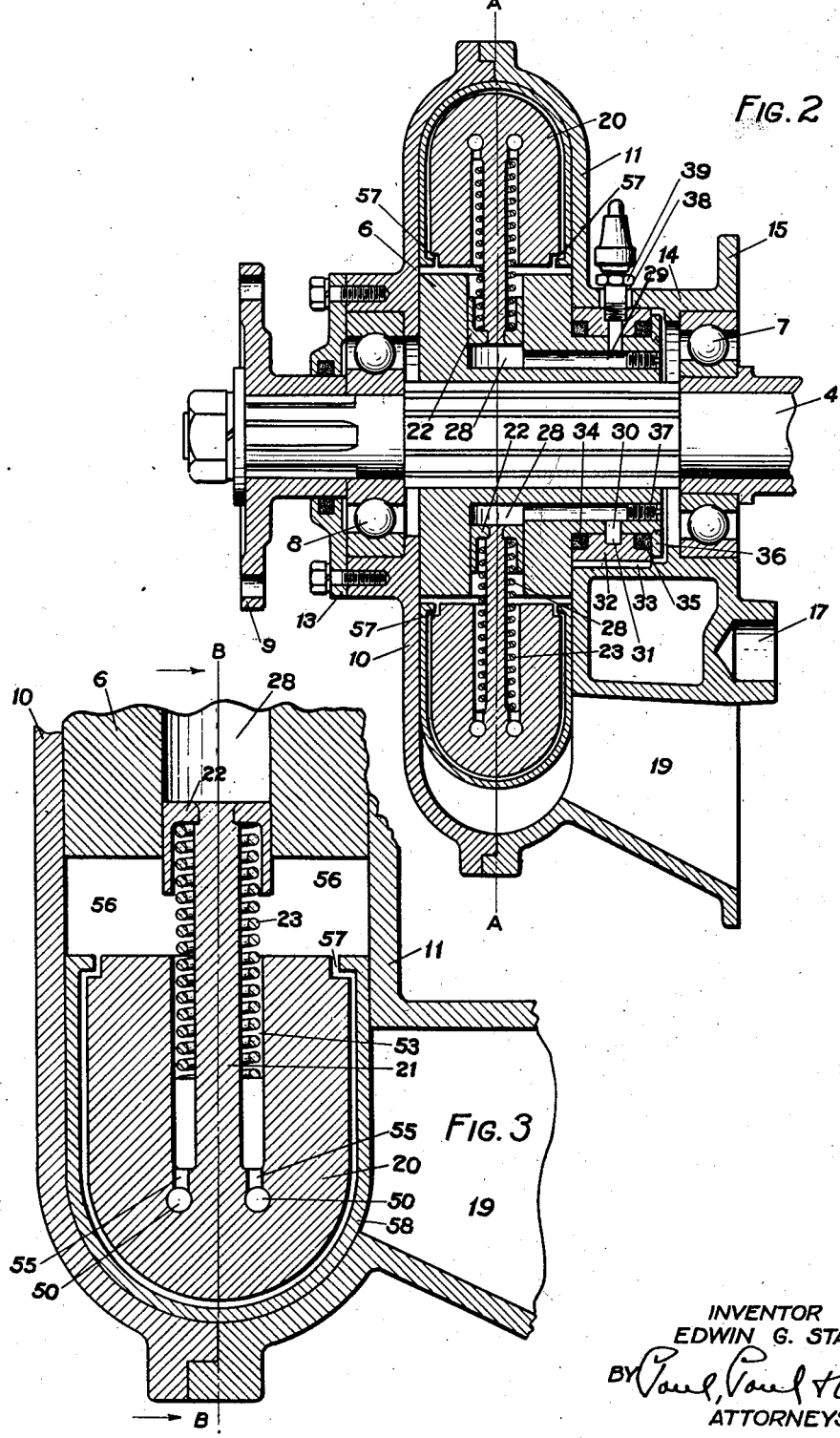

Sept. 14, 1926.  
E. G. STAUDE  
HYDRAULIC BRAKE  
Filed July 24, 1924
1,599,439
5 Sheets-Sheet 3
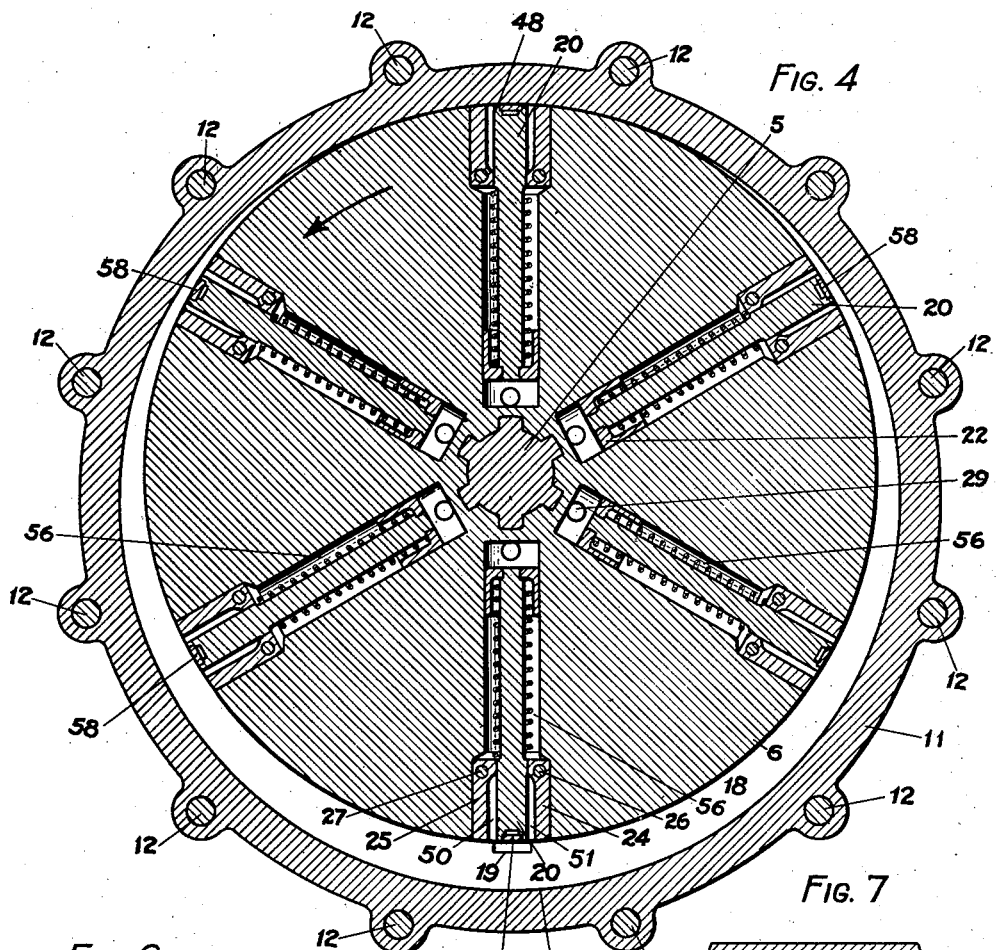
Fig. 4
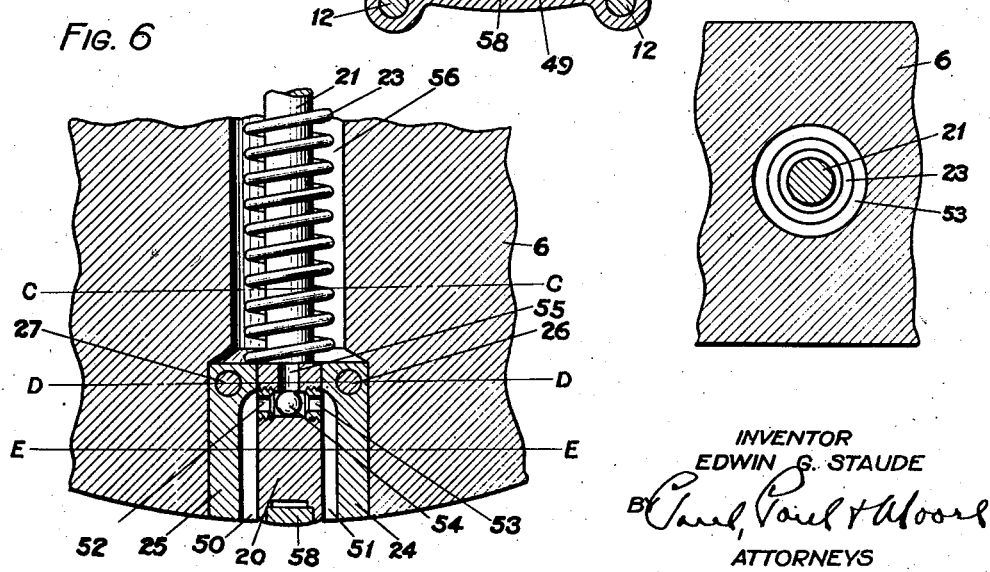
Fig. 6
Fig. 7
INVENTOR
EDWIN G. STAUDE
BY *Paul, Paul & Moore*
ATTORNEYS Sept. 14, 1926.  E. G. STAUDE  1,599,439
HYDRAULIC BRAKE
Filed July 24, 1924     5 Sheets-Sheet 4

INVENTOR
EDWIN G. STAUDE
BY Paul, Paul & Moore
ATTORNEYS

Sept. 14, 1926.
E. G. STAUDE
1,599,439
HYDRAULIC BRAKE
Filed July 24, 1924   5 Sheets-Sheet 5
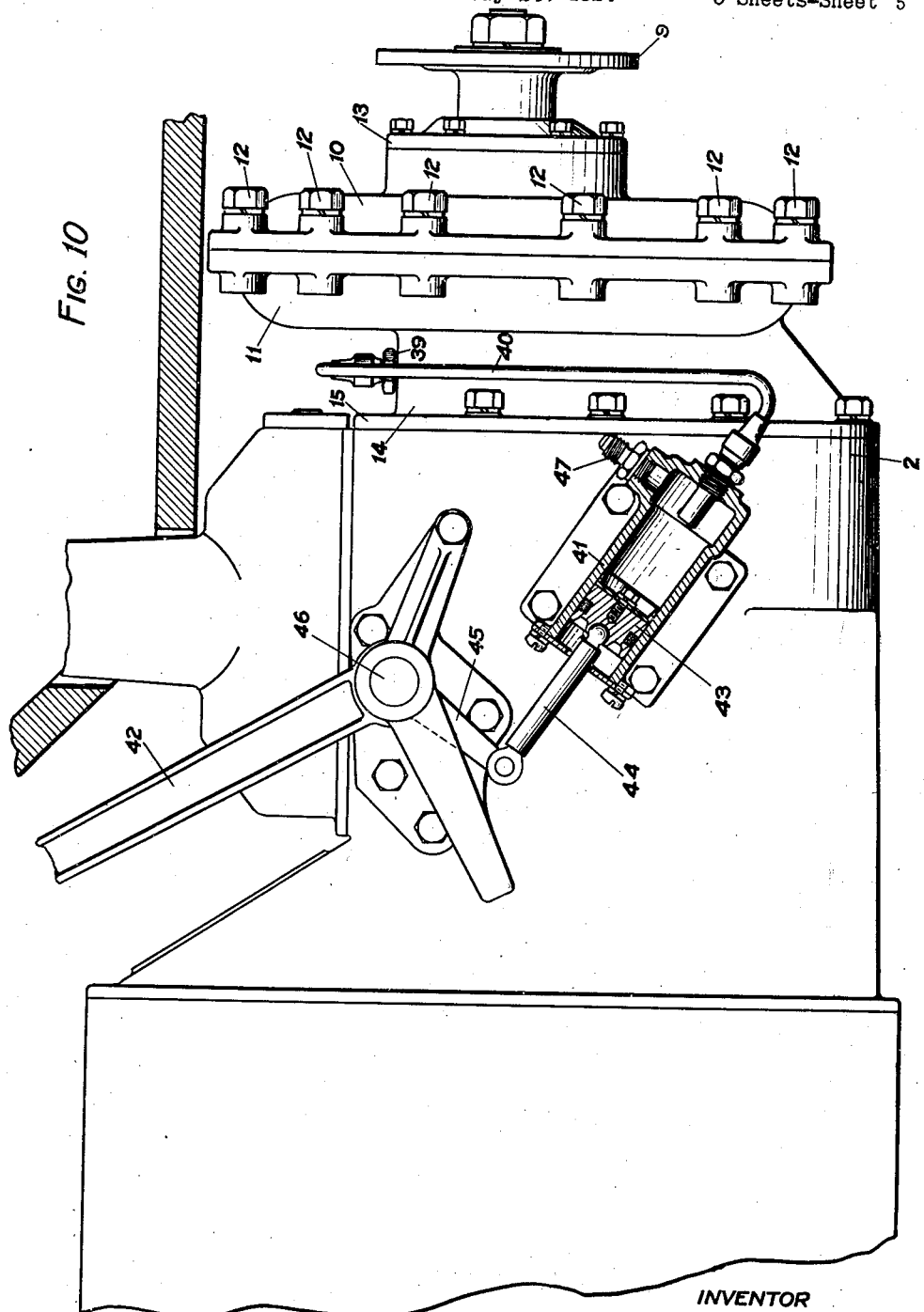
INVENTOR
EDWIN G. STAUDE
BY
ATTORNEYS Patented Sept. 14, 1926.

1,599,439

UNITED STATES PATENT OFFICE.

EDWIN GUSTAVE STAUDE, OF MINNEAPOLIS, MINNESOTA.

HYDRAULIC BRAKE.

Application filed July 24, 1924. Serial No. 727,965.

In the operation of power propelled vehicles, such as automobiles, trucks, etc., the checking of the speed is accomplished through what is known as friction brakes, usually in the form of a drum on the wheel or the propeller shaft with a band around the drum that is either contracted or expanded to cause friction and bring the vehicle to a stop.

In recent years the mechanism for operating these brake bands or internal brake shoes has been in a number of instances changed from the usual brake linkage mechanism, including brake rods, equalizing devices, etc., for what is known as the hydraulic system. This system comprises a master cylinder with a piston operated by a foot pedal to create pressure on the fluid in the cylinder and from the master cylinder through a pipe which leads to each of the different brakes where the pressure is applied against the piston in another small cylinder, the piston rod of said piston being connected to a mechanism that expands the internal brake shoe or contracts the brake band for the purpose specified.

It will be noted that all of these devices serve to turn inertia into what is ordinarily known as kinetic energy or heat. On long inclines this heat is sufficient to burn out the brake lining, which will either destroy this functioning of the brake entirely or at least require frequent adjustment.

Further, the continued use of friction brakes will cause the brake bands or brake shoes to wear down rapidly and cause the brake bands or shoes to chatter and shriek. This noise can only be eliminated by frequent treatment of the brake lining and also frequent adjustment.

In my invention I have eliminated entirely what is known as a friction brake, and while it is presumed to be an engineering principle that all inertia which is retarded the power required for retarding will evidence itself in heat, I have found that in practice with my device, this is not the case, the difference being this fact—In the friction brake band the heat is always proportional with the friction of one surface against another, since in that case friction is the only retarding influence. In my device this same feature is not true, because surfaces in contact are kept lubricated and the actual friction is so small that the heat is easily radiated without making any special provisions, such as fins on the outer surface of the casing to assist in radiation.

Since oil cannot be compressed, it cannot generate heat when under pressure.

With my invention the actual retarding of speed is accomplished by pressure of the oil against the vanes, the actual circulation friction or so called "stirring loss" being reduced to practically nothing.

This will permit the continuous application of my hydraulic brake with very little heat, and since all the parts are self lubricated, the moving parts will wear indefinitely.

I have also balanced the pressures within the rotor of my invention so that the oil pressure will be equalized, and the required foot pressure can be absolutely controlled to meet the desire of the operator, regardless of the load to be controlled.

Briefly, my invention consists of a rotor splined to the rear of the transmission shaft, said rotor having a series of radially moving vanes. These vanes are normally held within the rotor by springs and the rotor is adapted to operate within a fluid tight case of a larger diameter than the rotor, the lines meeting at one point in a circumference, so that the rotor being free to revolve on its axis, and the vanes being held within the rotor, and the case having an axis off center from the axis of the rotor, and the space between being filled with fluid, preferably the usual transmission oil, it follows that this oil will not be disturbed or circulated when the rotor revolves normally, because the vanes lie within the rotor, and since there is no circulation there can be no friction and therefore no heat, because the rotor itself is free to revolve within the casing and does no work.

The fact that the rotor runs in oil, simply lubricates it and the rotor only serves to retard the movement of the transmission shaft when the vanes are forced out to fill the space within the rotor casing.

The mechanism for accomplishing this result will be described later on in the specification.

As before stated, heat can only come from friction, and the friction depends on the volume of fluid displaced, the size of the opening through which the fluid passes, and whether or not there are short bends in the circuit.

From my invention it is clear that the fluid is not disturbed at all when the vanes are withdrawn into the rotor and only proportionately disturbed as the vanes travel out to fill the space within the casing, depending on the degree or amount of checking required.

Additional advantages present themselves with the use of my invention, such as positive control, smoothness of action, ease of application, long life, no adjustments, positive in action, extreme simplicity, etc.

The invention consists generally in various constructions and combinations, all as hereinafter described and particularly pointed out in the claims.

In the accompanying drawings forming part of this specification,

Figure 2 is an enlarged view of the rear of Figure 1, showing the rotor and casing in section.

Figure 3 is a further enlarged detail of the lower part of Figure 2.

Figure 4 is a cross section on the line AA of Figure 2, showing the vanes in the inoperative or running position so that the rotor may revolve in either direction without circulating the fluid or being retarded by same.

Figure 6 is a detail enlarged section of one of the vanes in the rotor section being on the line BB of Figure 3.

Figure 7 is a cross section on the line CC of Figure 6.

Figure 10 is a side view of my invention showing its application to the transmission of a motor vehicle, the view being taken from the opposite side to that of Figure 1, and shows the location of the master cylinder in section; also the usual connections between the piston rod of said cylinder and the foot pedal.

Figure 1:
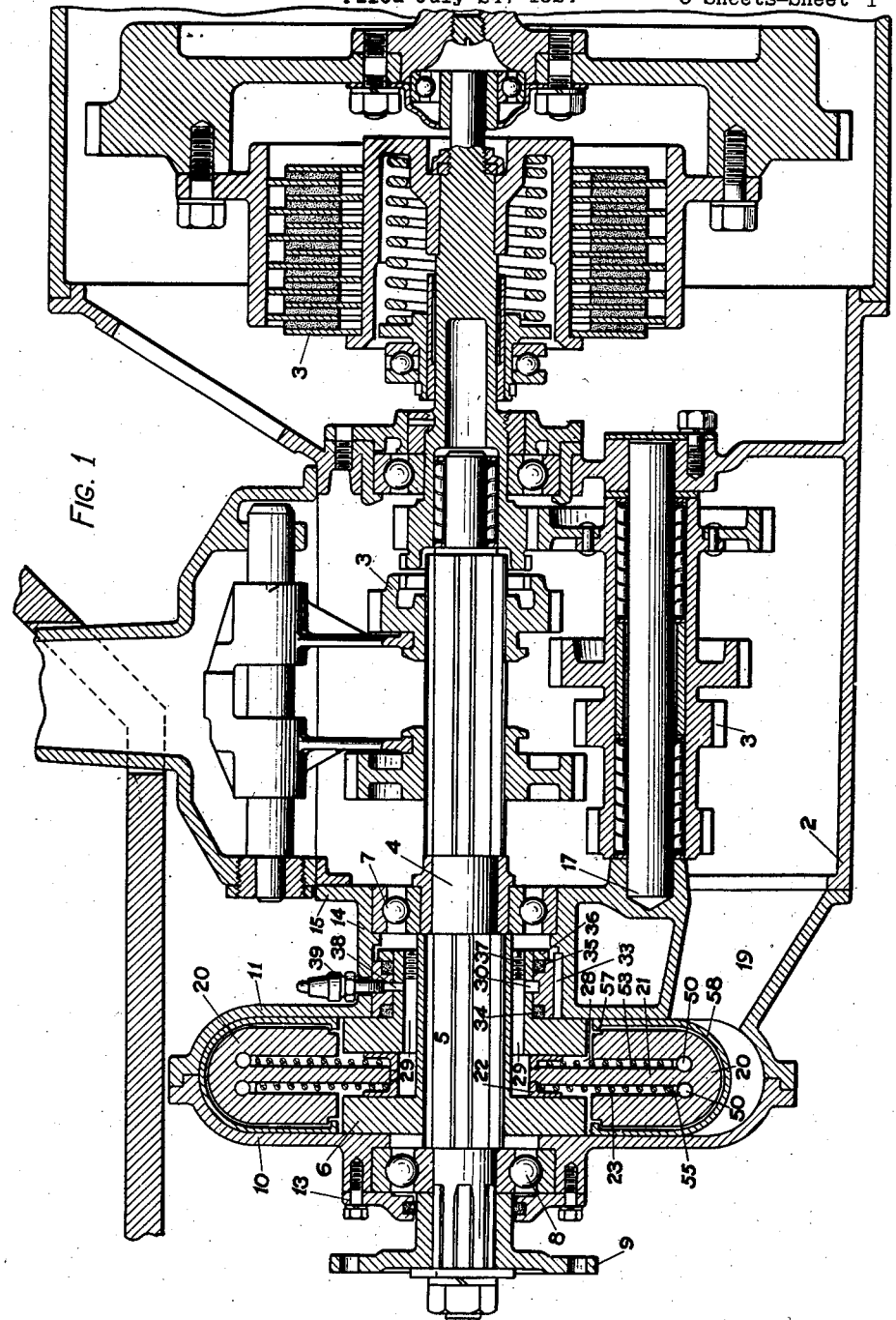
Figure 1 is a sectional view through the casing of the rotor comprising my invention and showing its application to the transmission of an ordinary motor vehicle.
Figure 5:
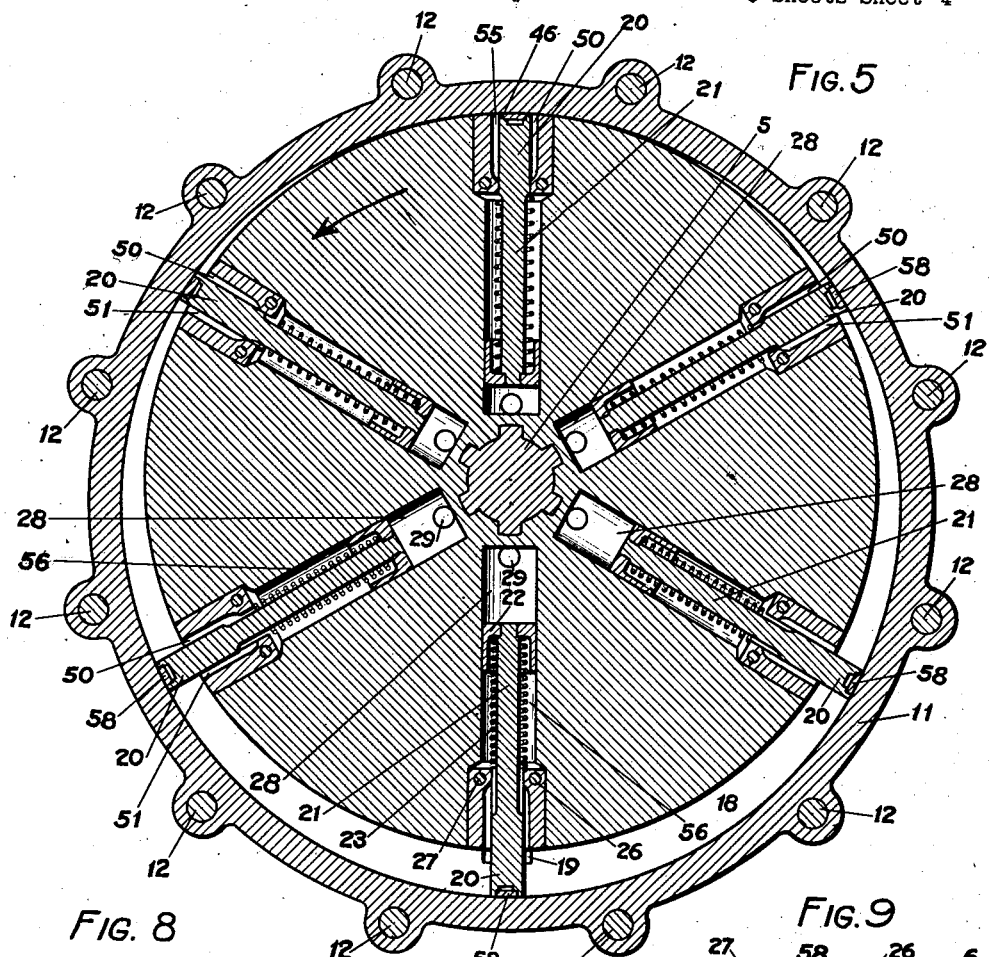
Figure 5 is a similar view to Figure 4, but showing the vanes in the extreme operative or retarded position.
Figure 8:
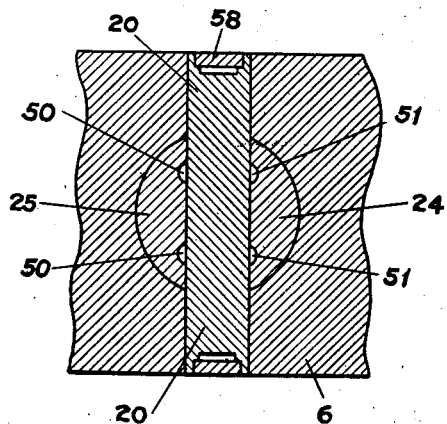
Figure 8 is a cross section on the line DD of Figure 6.

In the drawing I have illustrated a preferable construction in which 2 represents the casing of an ordinary motor vehicle transmission, having the usual clutch and transmission gears 3.

4 is the transmission shaft which has an extended portion 5 upon which I mount a rotor 6. The transmission shaft has the usual ball bearings 7 and 8 and also the usual propeller shaft coupling 9.

The rotor 6 is adapted to revolve in a casing 10 and 11 and held together by bolts 12.

The purpose of making the casing in two parts and dividing it on the center line is merely a simplified form to manufacture and assemble, and necessarily includes suitable packing material to insure a tight joint.

To keep the oil from flowing out at the propeller shaft connection, I provide the usual flange collar 13.

The housing or casing part 11, is provided with an extension 14 for carrying the bearing 7, and also is formed with an end plate 15 on the end which closes the end of the transmission case 2.

The plate 15 also has the usual bearing 17 for the counter shaft in the transmission and also other bosses and bearings that may be required.

As shown in the drawing, the extension 5 of the transmission shaft 4 is splined so that as it revolves the rotor must revolve with it. The rotor can, however, adjust itself parallel with the transmission shaft so as to be free to line up within the rotor casing.

In order to provide a fluid, (preferably oil), in the chamber 18 within the rotor casing, I form an opening 19 which connects the rotor casing with the inside of the housing of the transmission, so that the fluid in the transmission is free to flow through the passage 19 into the rotor casing and seek its own level.

From the above description it is clear that the rotor is free to revolve within the rotor casing in the bath of oil without causing any forced circulation and therefore causing no friction.

Figure 9:
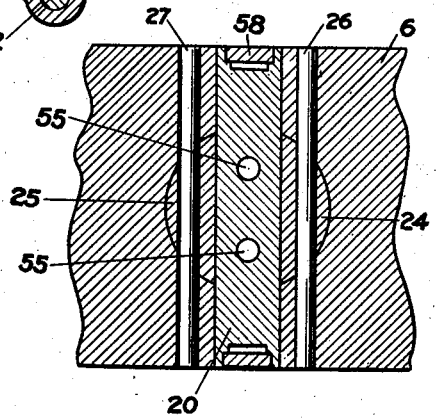
Figure 9 is a cross section on the line EE of Figure 6.

In order to retard the rotor in a varying degree, I provide a series of vanes 20 in the periphery of the rotor. These vanes are U shaped and fit in slots cut in the rotor and preferably have a round extension 21 riveted or otherwise secured to a piston 22 with a spring 23 (see Figure 3), one end of the spring bearing against one side of the piston 22 and the other end of the spring bearing against 24 and 25 (see Figure 6). These blocks are held in position by pins or rivets 26 and 27 (see Figures 6 and 9). The piston 22 operates in a small cylindrical opening 28.

The blocks 24 and 25 serve merely as a stop for the spring and are necessary in order to assemble the parts.

From the construction just described, it is clear that the action of the spring serves to at all times hold the radially movable vanes in the inward position or within the surface of the rotor.

In order to force the vanes out into a varying degree of action, I provide a port 29 to connect with the rear of the cylinder 28 and through a hole 30 with an annular groove 31 in an annular ring 32. This annular ring 32 is provided with a key 33 to prevent it from revolving with the rotor 6, since the key is secured in part in the casing 11.

Suitable packing material 34 and 35 keeps the oil within the groove 31 and the ring 32 is secured in position by a nut 36.

The ends of the port 29 are blocked up with small screws 37.

At a point 38 in the ring 32, I provide a nipple 39 which is connected to the pressure line 40 with the master cylinder 41.

42 is an ordinary foot pedal connected to the piston 43 within the master cylinder 41 through the piston rod 44, and the crank arm 45 secured to the foot pedal shaft 46.

The foot pedal being in its upward or inactive position, the space back of the piston 43 is filled with oil or other fluid, preferably automatically through the connection 47 which connects with an auxiliary tank elsewhere located and through a suitable check valve (not shown) keeps the master cylinder full of fluid.

As the foot pedal 42 is depressed it moves the piston 43 and forces the fluid out of the master cylinder through the line 40 and to the nipple 39 through the port 38 into the space 31, and then through the various ports 29, so that an equal pressure will be applied against all of the pistons 22 within the rotor.

As the pressure on the foot pedal 42 is increased, the fluid pressure will overcome the resistance of the spring 23 and force the piston 22 out radially and thereby move the vanes out into the path of the fluid in the space 18.

As the rotor 6 involves, the vanes now having only partly moved their maximum distance, they will strike the outer edge of the rotor casing, which will force them back within the rotor at the point 48, which is preferably on the top.

As the piston 22 is forced towards the center of the rotor, it will displace the oil in back of it, but since all of the ports 29 connect to the same groove 31, it follows that the fluid that is forced out of one of the cylinders will flow into a corresponding cylinder that has a piston traveling outward, so that it is clear that the fluid dislodges itself within the rotor, but does not alter the volume passing through the tube 40.

As further pressure is applied to the foot pedal 42, the vanes are, of course, forced out against the bottom wall 49 of the rotor casing, and when in this position will compress the fluid within the space 18, since the fluid cannot pass at the point 48 and can only get by the pistons provided they are not out in their extreme outward position.

In order to further insure a perfect seal and prevent the fluid from passing the vanes when they are out in their extreme position, I provide small ports 50 and 51 connecting with the outer surface of the rotor with ports 52 and 53.

Assuming that the rotor is revolving in the direction of the arrow, the pressure will build up ahead of the vane 20 after it has passed the port 19 through the ports 51 and 53 and out of the port 52 through the port 50 and thereby pass the vane 20.

To prevent this, I provide a ball valve 54 so that the pressure coming up the port 51 through the port 53 will move the ball valve 54 over across the port 52 and thereby force the fluid through the port 55 through the spring chamber into the space 56 back of the vane 20.

This pressure will flow through the opening 57 back of a sealing ring 58 and force the ring out and insure a perfect seal between the walls of the rotor.

Because of the fact that as the vane revolves this sealing ring can technically have only one point of contact with the outer wall of the rotor casing, it therefore follows that as the pressure is set up ahead of the vane it will tend to creep under the vane in this radius part and force the vane towards the center of the rotor against the pressure caused by the master cylinder through the tube 40.

To counterbalance this pressure, I cause the fluid to flow into the space 56 which is of such area as to equalize the tendency of the pressure to force the vanes towards the center, so that the only pressure that has to be overcome by the master cylinder will be the pressure required to compress the springs 23.

I consider this balancing of the vane a very important feature and do not confine myself to the precise construction herein shown.

From the above description it is quite clear that when the foot pedal 42 is in the inactive position the springs 23 will cause the vanes 20 to recede within the rotor and thereby eliminate any circulation of the oil.

As the foot pedal 42 is partly depressed, the vanes will begin to appear beyond the surface of the rotor and cause a stirring action in the fluid within the chamber 18.

As the foot pedal is further displaced, this stirring action becomes a pressure ahead of the vanes, which increases as the vanes are forced further out toward the wall 49.

It follows that if the vanes are held in contact with the wall 49, no seepage of oil is permitted past the vanes and the rotor will be locked against rotation.

It will be noted that the rotor with the vanes will work equally well regardless of the direction of rotation of the rotor, so that if the motor vehicle should be going backwards and the direction of rotation reversed, the action of the vanes will be precisely the same, the pressure merely going over on the other side up through the ports 50, pushing the ball 54 to close the pasage 53, and the flow of the fluid will again be through the port 55.

In the manner as hereinbefore described, I have shown the pressure for forcing out the vanes generated by a foot pedal 42 on the master cylinder 41.

I do not, of course, confine myself to this construction, since I may combine this rotor with the various principles described in my brake control Patents #1,470,701 and #1,447,908 each of which sets up the pressure under control of the driver to supply all or part of the required foot pressure.

I do not wish to confine myself to motor vehicles alone, since it is clear that this device can be applied to practically any apparatus requiring a brake.

I do not limit my invention to the precise construction herein shown, because it is quite evident that anyone skilled in the art can alter the construction without departing from the invention.

I claim as my invention:

1. A fluid brake comprising a rotor, movable vanes therein, a casing within which said rotor revolves adapted to contain an inelastic fluid, fluid means for projecting said vanes to expose their surfaces to the resistance of the fluid and thereby control the speed of said rotor.

2. A fluid brake comprising a fluid casing, a rotor, movable vanes in said rotor, means for holding said vanes normally within the surface of the rotor, fluid means for moving the vanes outward to check the speed of the rotor in the manner and for the purpose specified.

3. A fluid brake comprising a fluid casing, a rotor eccentrically mounted within said casing, movable vanes in said rotor, means for holding said vanes normally within the circumference of said rotor, fluid means for moving the vanes outward towards the wall of the casing for the purpose specified.

4. A fluid brake comprising a fluid casing, a rotor eccentrically mounted with reference to a part of the inner wall of the fluid case, movable vanes in said rotor, means for holding said vanes normally within the circumference of said rotor, fluid means for moving the vanes outwardly towards the wall of the casing, and counter-balancing pressure means for said vanes.

5. A fluid brake comprising a fluid casing having a fluid inlet, a rotor eccentrically mounted with reference to a part of the inner casing wall, movable vanes in said rotor, means for holding said vanes normally within the circumference of said rotor, fluid means for controlling the outward movement of said vanes for checking the speed of the rotor.

6. A fluid brake comprising a fluid casing having a fluid inlet and adapted to contain an inelastic fluid, a rotor mounted within said fluid casing, movable vanes in said rotor, springs for holding said vanes normally within the circumference of said rotor, pistons secured to said vanes, a master cylinder having a piston, a foot pedal operatively connected to said piston whereby pressure on the foot pedal will force the fluid out of said master cylinder against said pistons to project said vanes, for the purpose specified.

7. A fluid brake comprising a fluid casing having a fluid inlet, a rotor mounted within the fluid casing, movable vanes in said rotor, springs for holding said vanes normally within the circumference of said rotor, pistons secured to said vanes, a master cylinder having a piston and communicating with said fluid casing, a foot pedal operatively connected to said master cylinder piston whereby pressure on said foot pedal will force the fluid out of said master cylinder against said vane pistons to project said vanes and pressure counter-balancing means for said vanes to assist vane piston pressure during a part of the working period.

8. A fluid brake comprising a fluid casing having a fluid inlet in communication with the transmission casing of a motor vehicle, a rotor mounted on the transmission shaft within the fluid casing, movable vanes in said rotor, means for holding said vanes normally within the circumference of said rotor, means for moving the vanes radially towards the wall of the fluid casing and pressure operated counter-balancing and sealing means for said vanes.

9. A fluid brake comprising a casing communicating with a source of fluid supply, a rotor mounted within said casing eccentrically with respect to the peripheral wall thereof, and having a braking connection, a plurality of reciprocating vanes mounted in said rotor and normally retracted within the peripheral surface thereof, pistons and chambers therefor connected with said vanes, and mechanism within control of a vehicle driver for forcing said pistons outwardly to project said vanes and expose the surfaces thereof to the resistance of the fluid in said casing.

10. A fluid brake comprising a casing communicating with a source of fluid supply, a rotor mounted within said casing, eccentrically with respect to the peripheral wall thereof and having a braking connection, a plurality of reciprocating vanes mounted in said rotor and normally retracted within the peripheral surface thereof, pistons and chambers therefor connected with said vanes, and mechanism within control of a vehicle driver for forcing said pistons outwardly to project said vanes and expose the surface thereof to the resistance of the fluid in said casing, said piston-forcing means including a cylinder and piston having a fluid pressure connection with chambers in the rear of said vane pistons.

11. A fluid brake comprising a fluid casing, a rotor, movable elements in said rotor, means for holding said movable elements normally within said rotor, fluid means for moving said movable elements into fluid contact to produce a resistance against said moving elements, thereby checking the speed of the rotor.

12. A fluid brake comprising a fluid casing, a rotor, stirring elements in said rotor, means for holding said stirring elements normally out of contact with the fluid in the fluid casing, fluid means for moving said stirring elements into varying degrees of contact with the fluid in the fluid chamber, for the purpose specified.

13. A fluid brake comprising a fluid casing, a rotor, means within said rotor for causing a stirring action to the fluid in the fluid casing, means for holding said stirring means normally within the said rotor, fluid means for projecting said stirring means, for the purpose specified.

14. A fluid brake comprising a fluid casing, a fluid pressure device within said casing having normally inactive radially movable elements, means under pressure for projecting said radially movable elements for the purpose specified.

15. A fluid brake comprising a rotor, a casing for said rotor adapted to contain an inelastic fluid, radially movable elements in said rotor adapted to be exposed to the resistance of the fluid in said casing and thereby control the speed of said rotor, and means whereby these radially moving elements are balanced.

16. A fluid brake comprising a casing, a rotor, radially moving members in said rotor, means for normally retracting said members, and fluid means for projecting said members to check the speed of the rotor.

In witness whereof, I have hereunto set my hand this 17th day of June 1924.

EDWIN GUSTAVE STAUDE.